US010648063B2

(12) United States Patent
Mudring et al.

(10) Patent No.: US 10,648,063 B2
(45) Date of Patent: May 12, 2020

(54) DISSOLUTION AND SEPARATION OF RARE EARTH METALS (71) Applicant: Iowa State University Research Foundation, Inc., Ames, IA (US)

(72) Inventors: Anja-Verena Mudring, Stockholm (SE); Denis Prodius, Ames, IA (US); Cajetan Ikenna Nlebedim, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 15/998,079

(22) Filed: Jun. 25, 2018

(65) Prior Publication Data

US 2018/0312941 A1   Nov. 1, 2018

Related U.S. Application Data (63) Continuation-in-part of application No. PCT/US2017/000052, filed on Aug. 29, 2017.

(60) Provisional application No. 62/495,211, filed on Sep. 6, 2016.

(51) Int. Cl.
*C22B 59/00* (2006.01)
*C22B 7/00* (2006.01)

(52) U.S. Cl.
CPC .............. *C22B 59/00* (2013.01); *C22B 7/006* (2013.01); *Y02P 10/234* (2015.11); *Y02P 10/236* (2015.11)

(58) Field of Classification Search
CPC .................................................... C22B 59/00
See application file for complete search history.

(56) References Cited

U.S. PATENT DOCUMENTS 4,650,652 A    3/1987  Naitou et al. ................ 423/21.1

FOREIGN PATENT DOCUMENTS

| JP | 60-090823 | 5/1985 |
| JP | 60-161339 | 8/1985 |
| JP | 09-291320 | 11/1997 |
| JP | 2012-224943 | 11/2012 |
| JP | 2014-095132 | 5/2014 |
| JP | 2014095132 A * | 5/2014 |

OTHER PUBLICATIONS

Koen Binnemans et al., Recycling of rare earths: a critical review, Journal of Cleaner Production, 51, 1-22, 2013.
Chunhua Yan et al., Rare Earth Separation in China, Tsinghua Science And Technology, vol. 11, No. 2, 1-22, 2006.

* cited by examiner

*Primary Examiner* — Melissa S Swain (57) ABSTRACT

A chemical dissolution method is provided for use in recycling rare earth metal-containing material such as permanent magnet material including end-of-life magnet shapes, magnet scrap and Terfenol-D alloy material by mixing the rare earth metal-containing material and an aqueous solution of a copper (II) salt to dissolve the material in the solution. The dissolved rare earth metal is then precipitated from the aqueous solution as a rare earth metal compound, such as a rare earth metal oxalate, sulfate or phosphate from which rare earth metal oxide can be obtained.

25 Claims, 10 Drawing Sheets

DISSOLUTION AND SEPARATION OF RARE EARTH METALS

RELATED APPLICATION

This application claims benefit and priority of United States provisional application Ser. No. 62/495,211 filed Sep. 6, 2016, the entire disclosure of which is incorporated herein by reference.

CONTRACTUAL ORIGIN OF THE INVENTION

This invention was made with government support under Grant No. DE-AC02-07CH11358 awarded by the U.S. Department of Energy. The government has certain rights in the invention.

FIELD OF THE INVENTION

The present invention relates to a method for recovering rare earth elements from rare-earth containing materials such as magnet shapes, magnet scrap, powders derived from such materials and Terfenol-D alloy that involves chemical dissolution of the material.

BACKGROUND OF THE INVENTION

The need for rare earth metals such as neodymium (Nd), dysprosium (Dy) and praseodymium (Pr), samarium (Sm), terbium (Tb), is increasing much faster than its production. In the U.S., the demand is expected to further increase as the drive towards clean energy and high-tech devices increase. Neodymium (Nd), dysprosium (Dy), terbium (Tb), samarium (Sm) and praseodymium (Pr) are critical for high performance magnets strategic for technologies such as wind turbine power generators, electric motors in hybrid cars, and in everyday consumer products like computers, mobile phones amongst many others. Dy and Tb are enabling elements alloyed with iron (Fe) in Terfenol-D alloy; developed in naval ordinance laboratory for magnetostrictive applications such as naval sonar systems.

Nd, Tb and Dy are among the elements which the U.S. Department of Energy classified as being at risk of supply disruption. Recovering the critical elements from waste rare earth-containing materials can be economically and technically viable approach for addressing the supply risk challenge. Via recycling natural resources can be conserved, energy can be saved and less toxic wastes can be dumped in landfills. It is also desirable that a recycling process be environmentally friendly in order to reduce the emission of noxious fumes.

Recycling rare earth elements in materials can be either by directly reusing the materials or via chemical recovery of the rare earth elements. The chemical recovery methods for rare earth elements (REs) generally involve pyro-metallurgical and hydrometallurgical approaches. In the pyro-metallurgical approach, the REs recovery rates are reduced by the slag phase due to the high affinity of the REs with oxygen. Pyrometallurgical approaches also generate large amounts of solid waste and can be energy-consuming, although rare earths can be recovered as metals, instead of oxides. Hydrometallurgical routes enable higher recovery rates of REs, especially as oxides or other non-metallic forms. Nevertheless most hydrometallurgical approaches still require large energy consumption (pre-calcination) and the use of large amounts of chemicals, especially strong mineral acids such as hydrochloric, sulfuric and nitric acids.

High volumes of wastes contaminated by strong mineral acids present some environmental problems. Investment to contain both the mineral acids and their contaminated wastes add to the cost of the process. The use of acids in hydrometallurgical routes increases the complexity of recovering rare earth elements from magnets contained in e-waste devices, such as HDDs. This is because the magnets would need to be presorted or pre-concentrated before materials recovery can begin. As a rule, magnetic materials containing rare earth metals are part of the complex diversified end-of-life products and their pre-concentration or physical processing after shredding is a mandatory requirement. There is therefore the need for a cost-effective, environmentally friendly method for recycling rare earth metal-containing materials, such as permanent magnet materials and terfenol-D.

SUMMARY OF THE INVENTION

The present invention provides a hydrometallurgical process which involves mineral acid-free chemical dissolution for recovering rare earth elements from rare earth metal-containing materials. The acid-free chemical dissolution involves contacting the rare earth metal-containing material and an aqueous solution of a copper (II) salt to dissolve the material in the solution. The dissolved rare earth metal is then precipitated from the aqueous solution as one or more rare earth metal compounds (oxalates, sulfates or phosphates), which then can be calcined to produce rare earth metal oxides. In an illustrative embodiment of the invention, rare earth metal-containing magnet materials and an aqueous solution of a copper (II) salt were mixed to dissolve the material in the aqueous solution. In another illustrative embodiment of the invention, Terfenol-D magnetostrictive material (containing multiple rare earth metals) and an aqueous solution of a copper (II) salt were also mixed to dissolve the material. The dissolved rare earth metal then is precipitated from the aqueous solution as a rare earth metal oxalate, rare earth metal sulfate or rare earth metal phosphate which then can be calcined to produce rare earth metal oxide.

Practice of the present invention provides the following advantages:

1) Purity: Dissolution of the rare earth-containing material in a copper (II) aqueous solution can achieve >99% purity of the separated rare earth metals in the form of oxides, sulfates or phosphates.

2) Time efficiency: Recycling feedstock materials are quickly dissolved to recover the rare earth contents.

3) Environmental friendly: The dissolution method pursuant to the invention eliminates the need for mineral acids typically used for rare earth magnets dissolution. Instead, it is water-based and precludes the use of auxiliary hazardous chemicals or waste generation. The copper content of the aqueous solution is recovered as metallic copper, copper oxides or any of their mixtures. The separated iron resides in the aqueous solution that can be recycled or used for other applications.

4) Cost effective: This invention is based on readily available materials. The separation process requires no complex technological systems or equipment. It can be easily incorporated into existing manufacturing or separation process. The copper content of the by-product can be recovered as either metallic or oxides of copper for additional profit. Avoiding the use of mineral acids eliminates the capital investments for containing acids.

The present invention will become more readily understood from the following detailed description taken with the drawings.

DESCRIPTION OF THE INVENTION

The present invention relates to recovering of REs from RE-metal-containing materials by chemical dissolution in particular acid-free aqueous media. The present invention can be practiced in the recycling of rare earth metal-containing material that includes, but is not limited to, permanent magnets from end-of-life products, such as computer hard disk drives, electric motors, batteries, etc., magnet scrap material, such as cuttings, grinding swarfs and polishing byproducts, generated by magnet manufacturing processes and magnet powders generated by hydrogen decrepitation, grinding and other material pulverization processes, Terfenol-D alloy and other RE-iron materials. For rare-earth magnet containing electronic materials such as computer hard disk drives, the RE-containing component can be pre-concentrated, or it can be processed in the as-shredded condition without pre-sorting and thermal demagnetization by practice of certain embodiments of the invention.

Recycling of rare earth metal-containing material pursuant to an embodiment of the invention involves the chemical dissolution of the material by mixing the rare earth metal-containing material and an aqueous solution of a copper (II) salt to achieve oxidative dissolution of the material in the solution. The dissolved rare earth metal then is precipitated from the aqueous solution as rare earth metal compound, which then can be calcined to produce rare earth metal oxide.

Figure 1A:
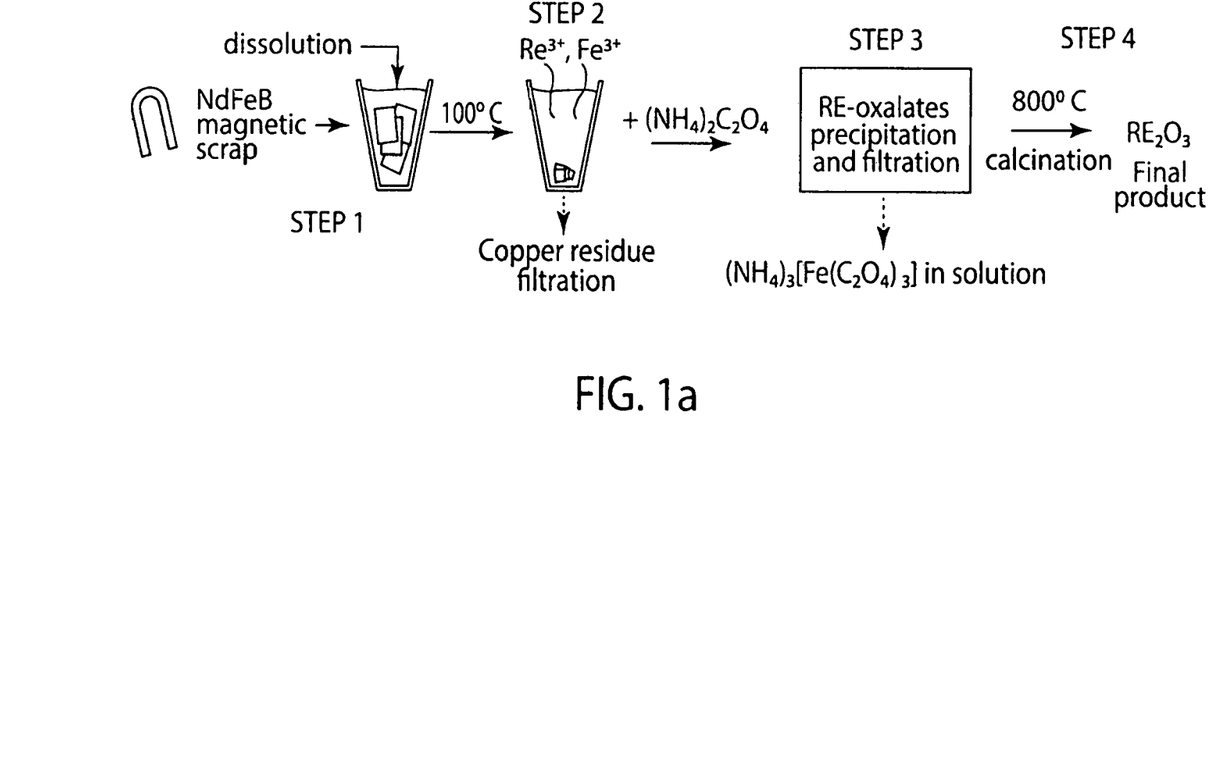
FIG. 1a is a schematic diagram of a recycling method that embodies a chemical dissolution method pursuant to an illustrative embodiment of the invention.

Using the $RE_2Fe_{14}B$ rare earth metal-containing magnet as an example in FIG. 1a (RE is one or more of Sc, Y, La, Ce, Nd, Pr, Sm, Eu, Gd, Tb, Dy, Ho, Er, Tm, Yb, Lu), the oxidative dissolution reaction at 100° C. can be represented as follows in equation 1.1 or 1.2.

$$4RE_2Fe_{14}B+2H_2O+96Cu^{2+}+27O_2 \rightarrow 8RE^{3+}+56Fe^{3+}+4HBO_2+48Cu_2O\downarrow \quad (1.1)$$

$$2RE_2Fe_{14}B+51Cu^{2+}+14O_2 \rightarrow 4RE^{3+}+28Fe^{3+}+Cu_3(BO_3)_2\downarrow+22Cu_2O\downarrow+4Cu^0\downarrow \quad (1.2)$$

The formation of $HBO_2$ in (equation 1.1) results from the possible dehydration of $H_3BO_3$. $H_3BO_3$ may subsequently react with Cu(II) cations and result in the formation of $Cu_3(BO_3)_2$ (equation 1.2). The observation of $Cu_3(BO_3)_2$ is easier at higher amounts of magnet materials (e.g. 1 kg) compared to lower amounts (e.g. 10 g).

Ammonium oxalate is added to precipitate rare earth element as rare earth oxalate and separation of the $Fe^{3+}$ content remaining in the solution pursuant to the reaction:

$$2RE^{3+}+14Fe^{3+}+42NH_4^++45C_2O_4^{2-} \rightarrow RE_2(C_2O_4)_3\downarrow+14(NH_4)_3[Fe(C_2O_4)_3] \quad (2)$$

The rare earth oxalate can then be separated by filtration followed by subsequent washing and calcination to obtain rare earth oxides.

$$2RE_2(C_2O_4)_3+3O_2 \rightarrow 2RE_2O_3+12CO_2\uparrow \quad (3)$$

In Equation 1, RE represents Nd and Pr for the starting rare earth magnet scrap, but can be one or more of the other rare earth metals (RE=Sc, Y, La, Ce, Sm, Eu, Gd, Tb, Dy, Ho, Er, Tm, Yb, Lu) when a different starting rare earth metal-containing magnet material is used. The present invention can be practiced in the recycling of various types of rare earth metal-containing materials that includes but is not limited to, Nd—Fe—B, Nd—Fe—Dy—B, Nd—Pr—Fe—Dy—B, Nd—Fe—Tb—B, Nd,Pr—Fe—B (See Example 1), shredded electronic materials containing rare-earth permanent magnets (See Example 2), Sm—Co—Fe, Sm—Co—Fe—Cu—Zr, Sm—F—N Sm—Co, (See Example 3), Terfenol-D magnetostrictive material (See Example 4). These materials can be with or without other alloying elements including but not limited to Co, Ga, Al, Ti, etc.

In an illustrative embodiment of the invention, the rare earth metal-containing magnet material and an aqueous solution of a copper salt are mixed under conditions to dissolve the material in the aqueous solution. The parameters controlled to achieve the oxidative reaction of Equation (1) are temperatures, time and particles sizes of the materials. The dissolved rare earth metal then is precipitated from the aqueous solution as a rare earth metal oxalate or sulfate, which then can be calcined to produce rare earth metal oxide. The copper content of the aqueous solution can be recovered as copper oxide for recycling or use in other applications.

In practicing embodiments of the present invention, the inorganic copper (II) salt can include, but is not limited to, copper (II) acetate, copper (II) nitrate, copper (II) chloride and copper(II) sulfate wherein copper (II) salt means a salt of $Cu^{2+}$.

The aqueous solution can comprise 0.1 to 75 mole % copper (II) salt and balance water. In weight %, the aqueous solution preferably comprises 3 to 25 weight % copper (II) salt and balance water.

The temperature of the aqueous solution typically is maintained between ambient (room temperature) and 100° C. in practice of the embodiments of the invention. However, for purposes of illustration and not limitation, the applicable temperature range can be 10° C.-100° C. The mixture of the aqueous solution and the rare earth metal-containing material typically is stirred or otherwise agitated during the chemical dissolution method. However, the dissolution can also be performed without stirring or agitation.

The following examples are offered to further illustrate practice of the invention without limiting the invention in any way.

Example 1

The following example demonstrates acid-free dissolution of $RE_2Fe_{14}B$ magnet scrap (grinding swarf) to recover the RE content as oxide pursuant to the method scheme illustrated where RE=one or more of Sc, Y, La, Nd, Pr, Sm, Eu, Gd, Tb, Dy, Ho, Er, Tm, Yb, Lu.

An aqueous solution containing 3.3 weight % of copper (II) acetate was prepared. $RE_2Fe_{14}B$ magnet grinding swarf was added to the aqueous solution and stirred at 100° C. for three hours at 1000-1200 rpm to achieve the oxidative dissolution reaction Equation (1) above.

The copper content was precipitated pursuant to Equation (1) and filtered off, and can be recycled or used in other application.

Ammonium oxalate was then added to the aqueous solution to precipitate neodymium oxalate pursuant to reaction Equation (2) above. Ammonium iron oxalate formed and remained in the solution.

The precipitated neodymium oxalate then was separated by filtration, washed with water, and calcined at 800° C. to produce $RE_2O_3$ pursuant to reaction Equation (3).

A purity of greater than 99% of the rare earth contents was confirmed by XRF analysis. Selected XRF data for Fe, Cu, Ni, and rare earth metals (RE=Nd, Pr) indicated the following by comparing FIGS. 1b and 1c.

Figure 1B:
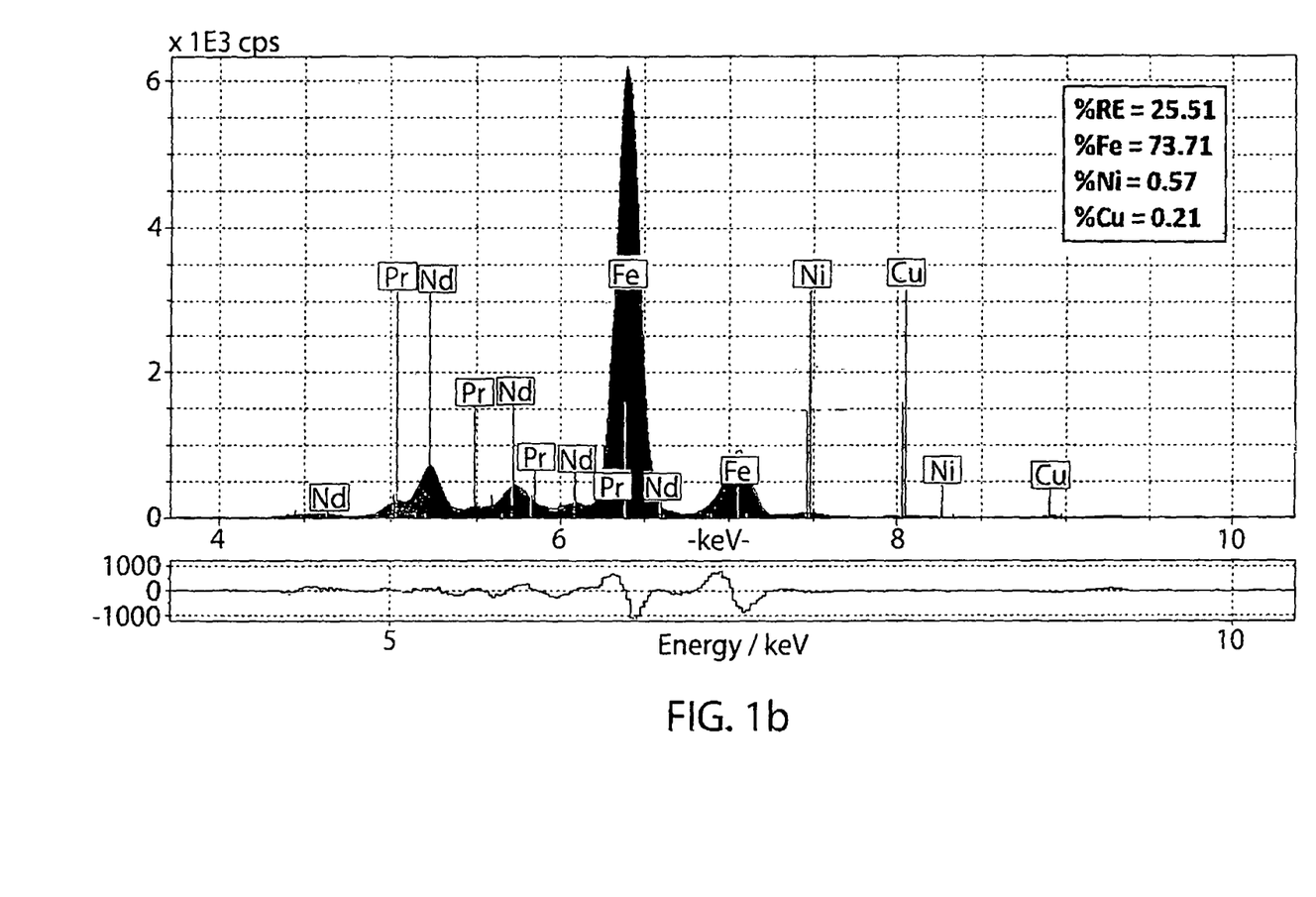
FIGS. 1b and 1c are XRF spectra for the starting Nd,Pr—Fe—B magnet swarf (FIG. 1b) and for the final $RE_2O_3$ product (FIG. 1c) resulting from practice of the invention for Nd,Pr—Fe—B magnet swarf. Inset is the selected XRF elemental data for iron, nickel, copper, and rare earth metals where XRF elemental data is expressed in weight % in the figures and in the text below.
Figure 1C:
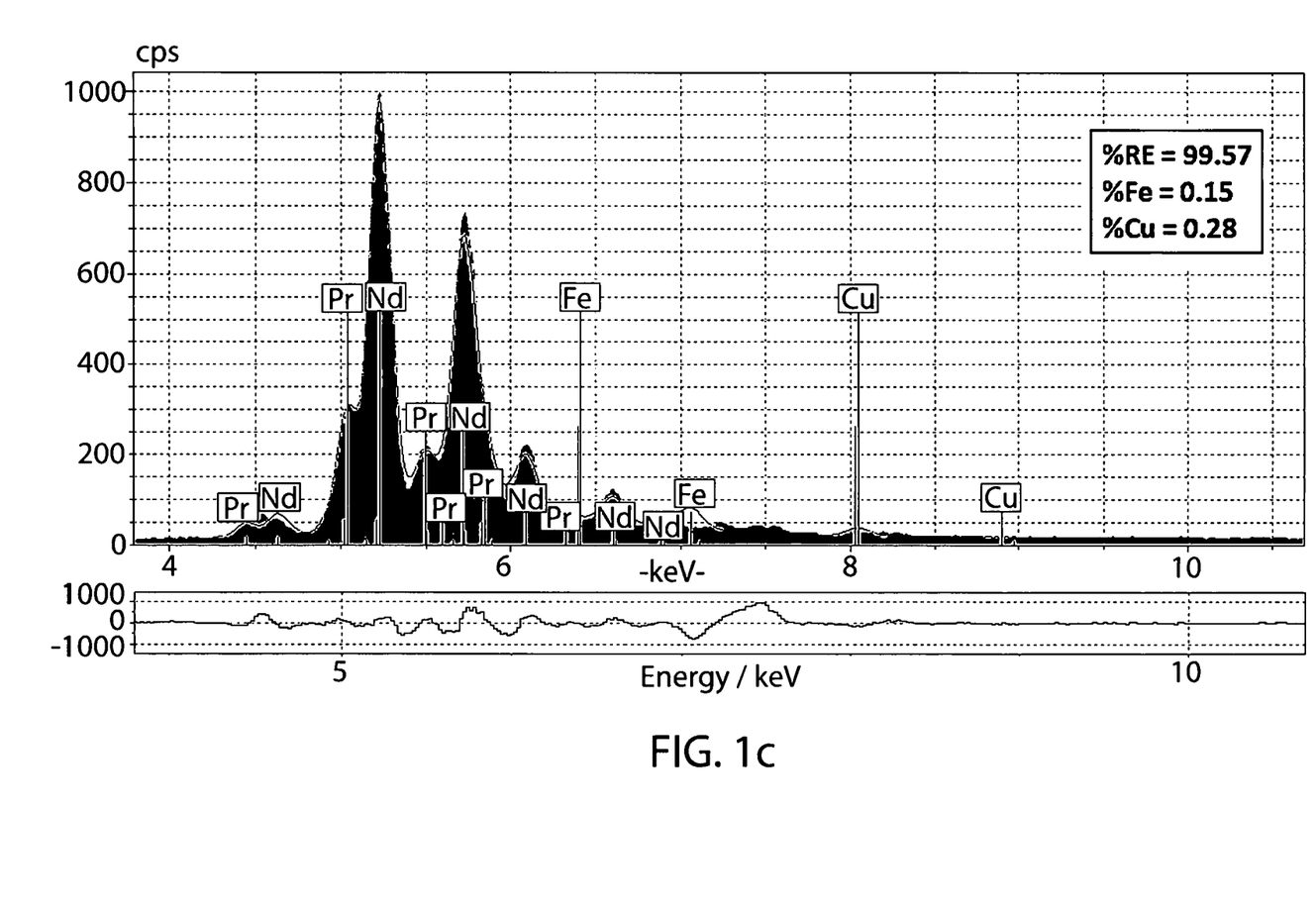

For the starting Nd,Pr—Fe—B magnet grinding swarf, the following XRF elemental contents were obtained: Fe=73.71%; RE=25.51%; Ni=0.57% and Cu=0.21%. The final $RE_2O_3$ product has the following XRF elemental contents: Fe=0.15%; RE=99.57% and Cu=0.28%.

Example 2

The following example demonstrates acid-free dissolution of the RE-Fe—B component of shredded electronic waste such as shredded computer hard disk drive (HDD) material to recover the RE content as oxide pursuant to the method of this invention where RE=one or more of Sc, Y, La, Nd, Pr, Sm, Eu, Gd, Tb, Dy, Ho, Er, Tm, Yb, Lu.

The RE magnet-containing computer hard disk drives can be shredded by any of the general purpose shredding techniques. In a particular illustrative example of the invention, shredded materials range from powder particles to chunks up to 50 $cm^3$. RE recovery was performed with the as-shredded chunks without pre-sorting and thermal demagnetization.

An aqueous solution containing 15.8 weight % of copper (II) chloride was prepared. The as-shredded hard disk drive chunks were added to the aqueous solution and stirred at room temperature until the RE-Fe—B component dissolved. The reaction resulted in the oxidative dissolution of the RE-Fe—B component and precipitation of the $Cu/Cu_2O$ mixture as a brown-red precipitate liberated from the other HDD components. The process can be represented as follows in equation (4.1) or (4.2) for processing HDD chunk material (contaminated magnet material):

$$4RE_2Fe_{14}B + 6H_2O + 96Cu^{2+} + 3O_2 \rightarrow 8RE^{3+} + 56Fe^{3+} + 4H_3BO_3 + 96Cu^0\downarrow \quad (4.1)$$

$$2RE_2Fe_{14}B + 51Cu^{2+} + 6O_2 \rightarrow 4RE^{3+} + 28Fe^{3+} + Cu_3(BO_3)_2 + 48Cu^0\downarrow \quad (4.2)$$

$$4Cu^0 + O_2 \rightarrow 2Cu_2O \quad (5)$$

$H_3BO_3$ (equation 4.1) may react with copper(II) cations and result in the formation of $Cu_3(BO_3)_2$ (equation 4.2) The observation of $Cu_3(BO_3)_2$ is easier at higher amounts of magnet materials compared to lower amounts.

The resulting powder of copper and copper oxide was filtered off from other components of the shredded HDD material that was liberated during recycling and can be recycled or used in other applications.

Ammonium oxalate was then added with stirring to the aqueous solution to precipitate RE-oxalate (where RE is a mixture of $Nd^{3+}$ and $Pr^{3+}$) pursuant to reaction Equation (2) above.

The precipitated RE-oxalate then was separated by filtration, washed with water, and calcined at 800° C. to produce $RE_2O_3$ pursuant to reaction Equation (3) above.

Some magnet content of the shredded hard disk drive was selected for XRF analysis to determine the elemental content of the rare earth component in the as-shredded hard disk drive. Purity level greater than 99% of the rare earth contents was confirmed by XRF analysis. Selected XRF data indicated the following by comparing FIGS. 2a and 2b.

Figure 2A:
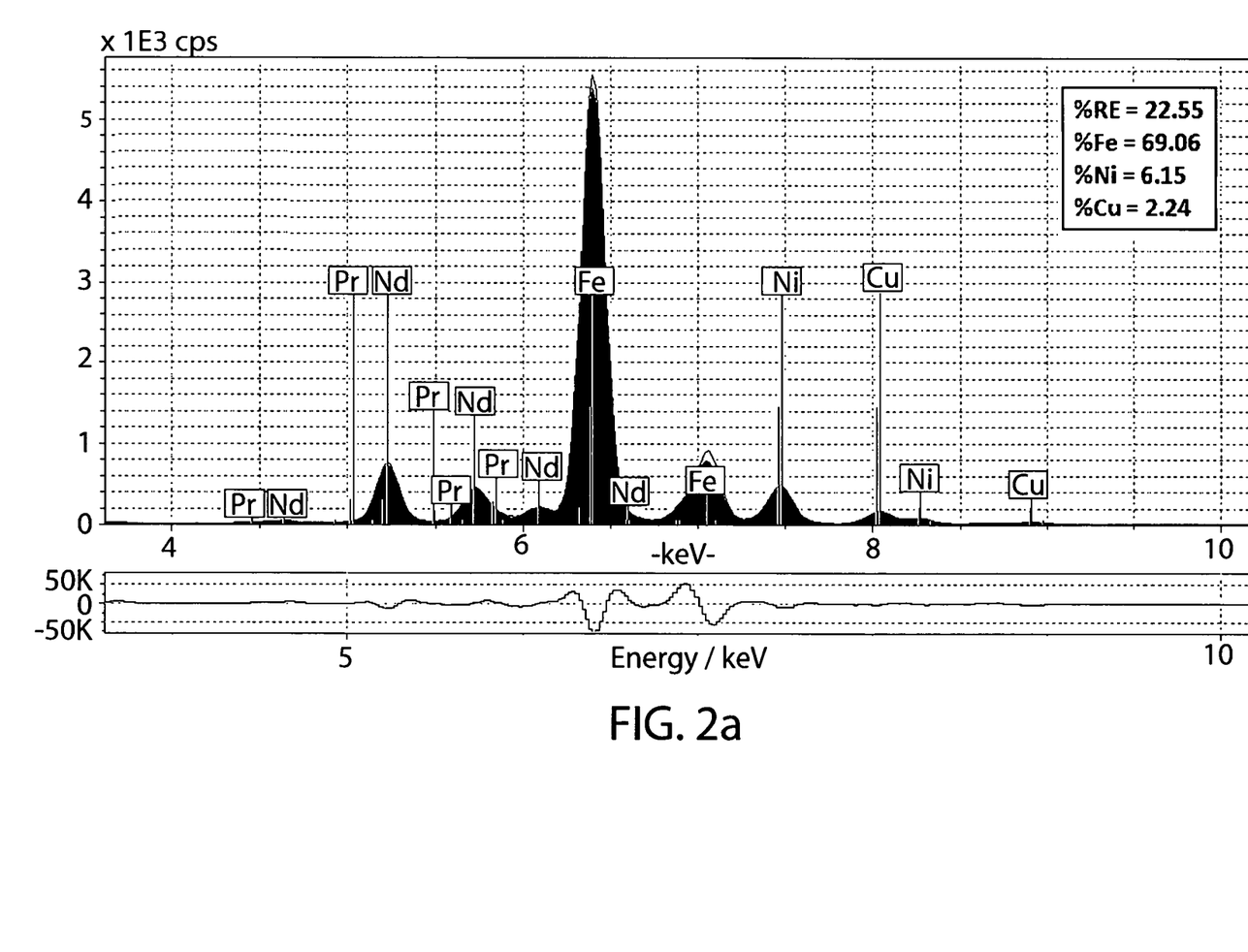
FIG. 2a is the XRF spectrum and elemental data for the rare-earth content of shredded hard disk drive before the as-shredded material was applied to the method of this invention.
Figure 2B:
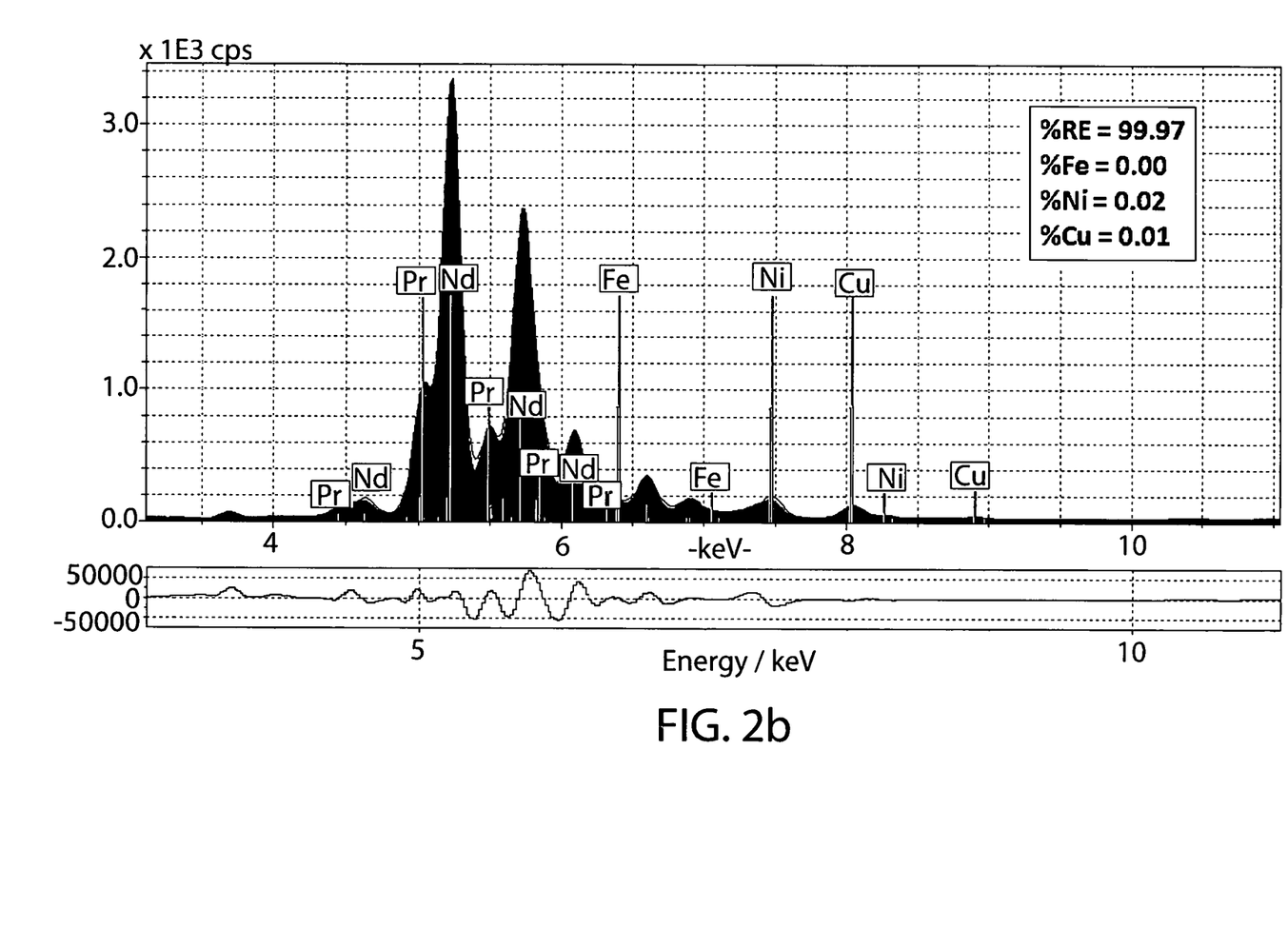
FIG. 2b is the XRF spectrum and elemental data of the recovered $RE_2O_3$ from the as-shredded hard drive disk material pursuant to another illustrative embodiment of the invention.

The starting materials contains: Fe=69.06%; RE=22.55%; Ni=6.15% and Cu=2.24%. The final $RE_2O_3$ product has the following elemental contents: Fe=0.00%; RE=99.97%; Ni=0.02% and Cu=0.01%.

The waste water clean-up was performed with $Ca(OH)_2$ according to:

$$2(NH_4)_3[Fe(C_2O_4)_3] + 3Ca(OH)_2 \rightarrow 2Fe(OH)_3\downarrow + 3CaC_2O_4\downarrow + 3(NH_4)_2C_2O_4 \quad (6)$$

Example 3

The following example demonstrates dissolution and separation of Sm—Co alloy magnet scrap (grinding swarf) to recover the samarium (Sm) and cobalt (Co) contents.

An aqueous solution containing 23.4 weight % of copper (II) sulfate solution was prepared. Sm—Co magnet swarf was added to the aqueous solution and stirred at 100° C. until the swarf was dissolved. The reaction resulted in the oxidative dissolution of the Sm—Co (e.g. $Sm_2Co_{17}$) alloy and precipitation of a mixture of copper and copper oxide.

$$Sm_2Co_{17} + 20Cu^{2+} + 5O_2 \rightarrow 2Sm^{3+} + 17Co^{2+} + 10Cu_2O\downarrow \quad (7)$$

The resulting copper oxide powder (97% phase purity, greater than 99% based on copper) was filtered off the solution and is of economic value.

To separate samarium, sodium sulfate was added to the remaining solution leading to the precipitation of samarium sulfate according to:

$$2Sm^{3+} + 3SO_4^{2-} + 8H_2O \rightarrow Sm_2(SO_4)_3 \cdot 8H_2O \quad (8)$$

Figure 3A:
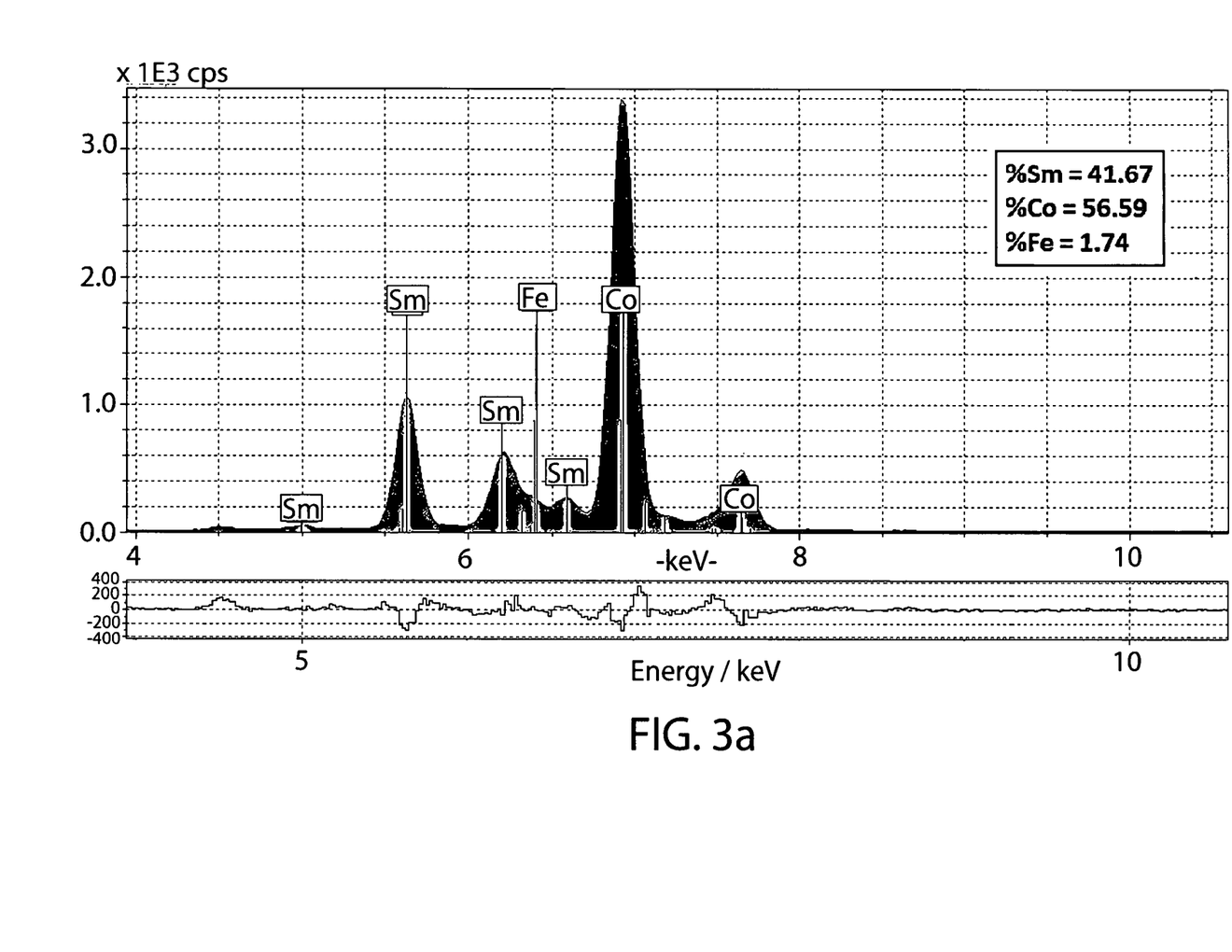
FIG. 3a is the XRF spectrum and elemental data for the starting Sm—Co magnet swarf.

The XRF spectra and elemental data showed the composition of the starting material as: Sm=41.67%, Co=56.59 and Fe=1.74% in weight %.

Figure 3B:
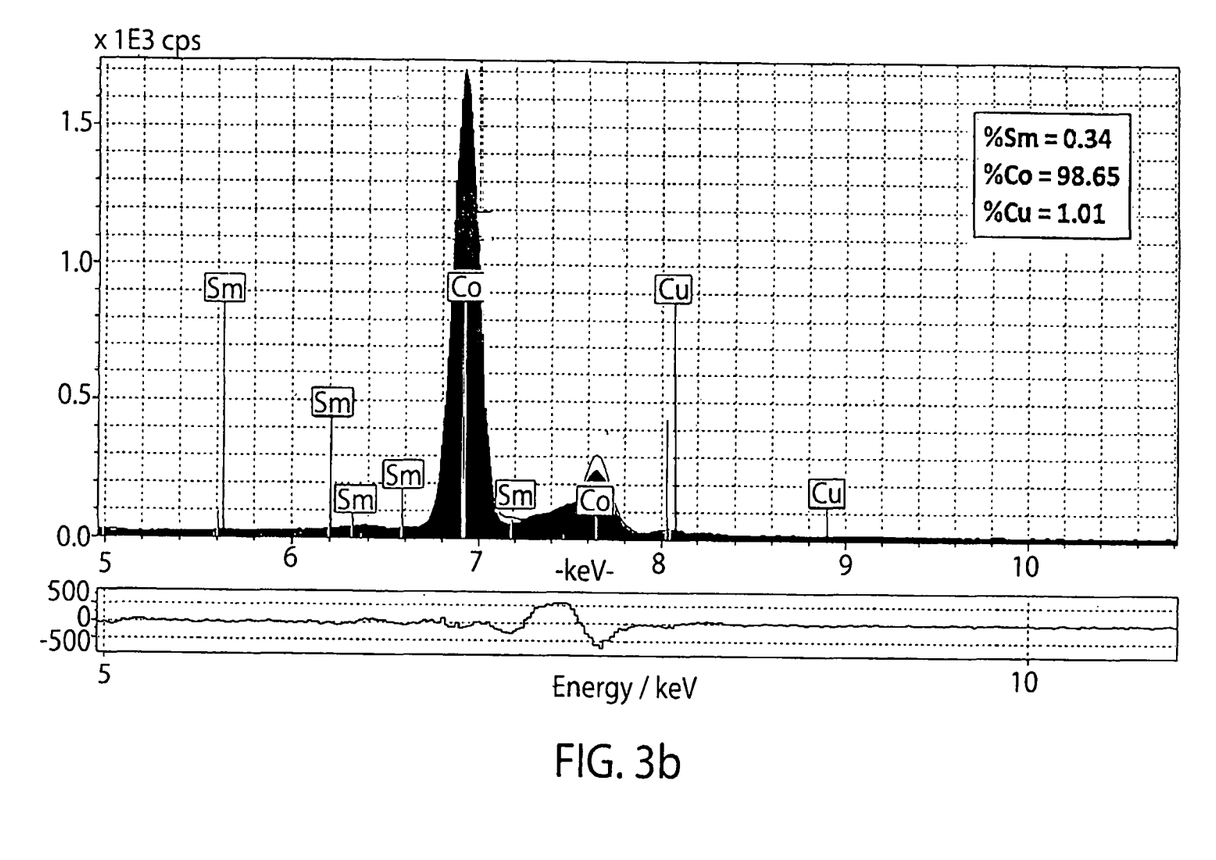
FIG. 3b is the XRF spectrum and elemental data for the recovered cobalt material.
Figure 3C:
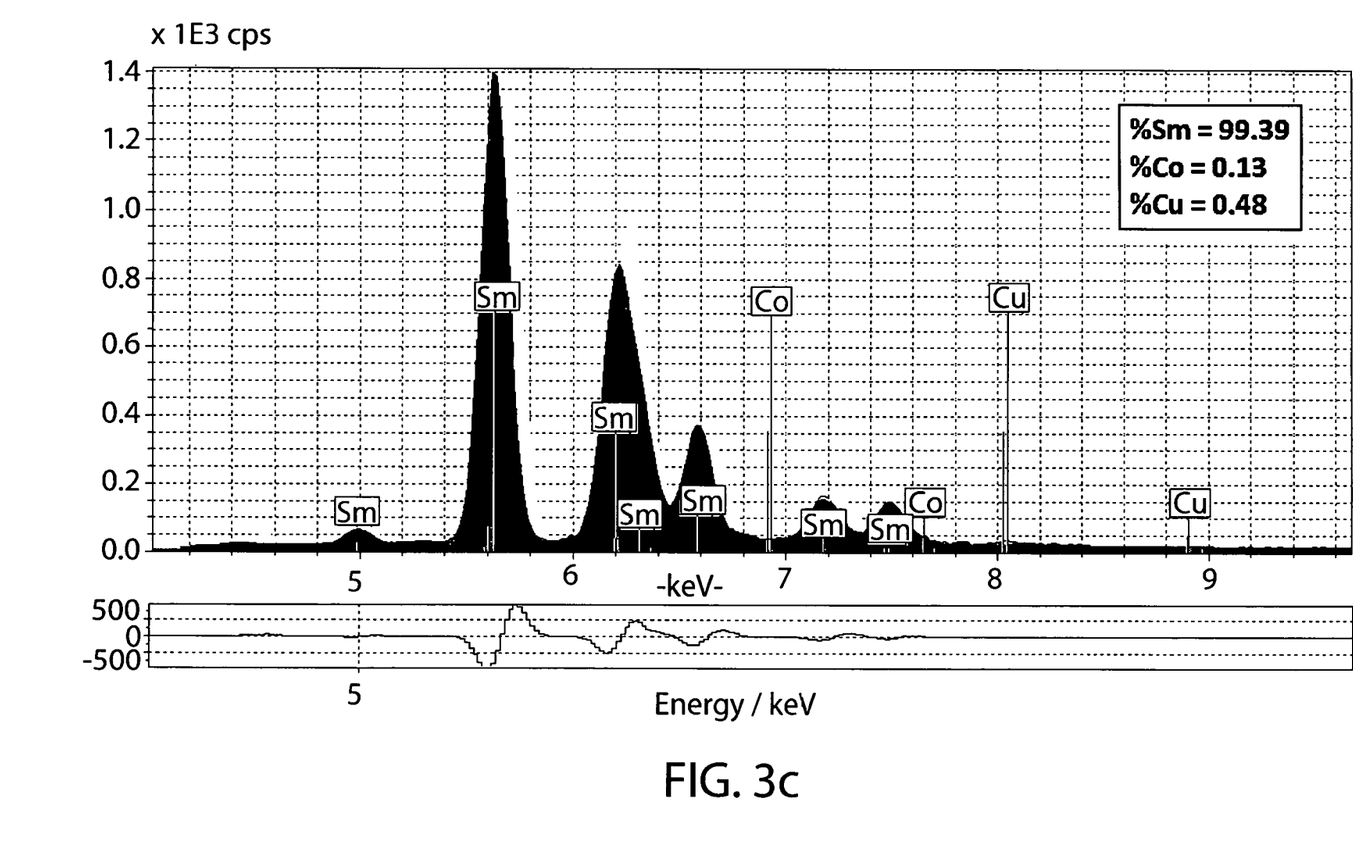
FIG. 3c is the XRF spectrum and elemental data for the recovered samarium compound.

The minimum yield of $Sm_2(SO_4)_3 \cdot 8H_2O$ was greater than or equal to 97%. The XRF spectra and elemental data showed the composition of the recovered samarium sulfate as: Sm=99.39%, Co=0.13% and Cu=0.48% in weight %.

Cobalt was afterwards recovered as cobalt(II) phosphate (greater than or equal to 99% yield) with purity determined by XRF as: Co=98.65%, Sm=0.34% and Cu=1.01% in weight %, according to:

$$3Co^{2+} + 2PO_4^{3-} + 6H_2O \rightarrow Co_3(PO_4)_2 \cdot 6H_2O\downarrow \quad (9)$$

Example 4

The following example demonstrates dissolution of magnetostrictive material known as Terfenol-D alloy containing terbium and dysprosium and recovery of terbium and dysprosium as oxides, pursuant to the method of this invention.

An aqueous solution containing 12.3 weight % of copper (II) nitrate was prepared by adding copper (II) nitrate to water. Chunks of Terfenol-D alloy, up to 1 cm³ in size, were added to the aqueous solution and stirred at 100° C. until the chunks dissolved. The reaction resulted in the oxidative dissolution of the $REFe_2$ alloy and precipitation of the $Cu/Cu_2O$ mixture as a brown-red precipitate.

(10)

The resulting powder of copper and copper oxide (greater than 99% based on copper) was filtered off the solution and can be recycled for economic values.

Ammonium oxalate was then added to the aqueous solution to precipitate rare earth oxalate pursuant to reaction Equation (2) above. Ammonium iron oxalate formed and remained in the solution.

The precipitated rare earth oxalate then was separated by filtration, washed with water, and calcined at 800° C. to produce RE-oxides (RE=Tb and Dy) pursuant to reaction Equation (3) above.

Figure 4A:
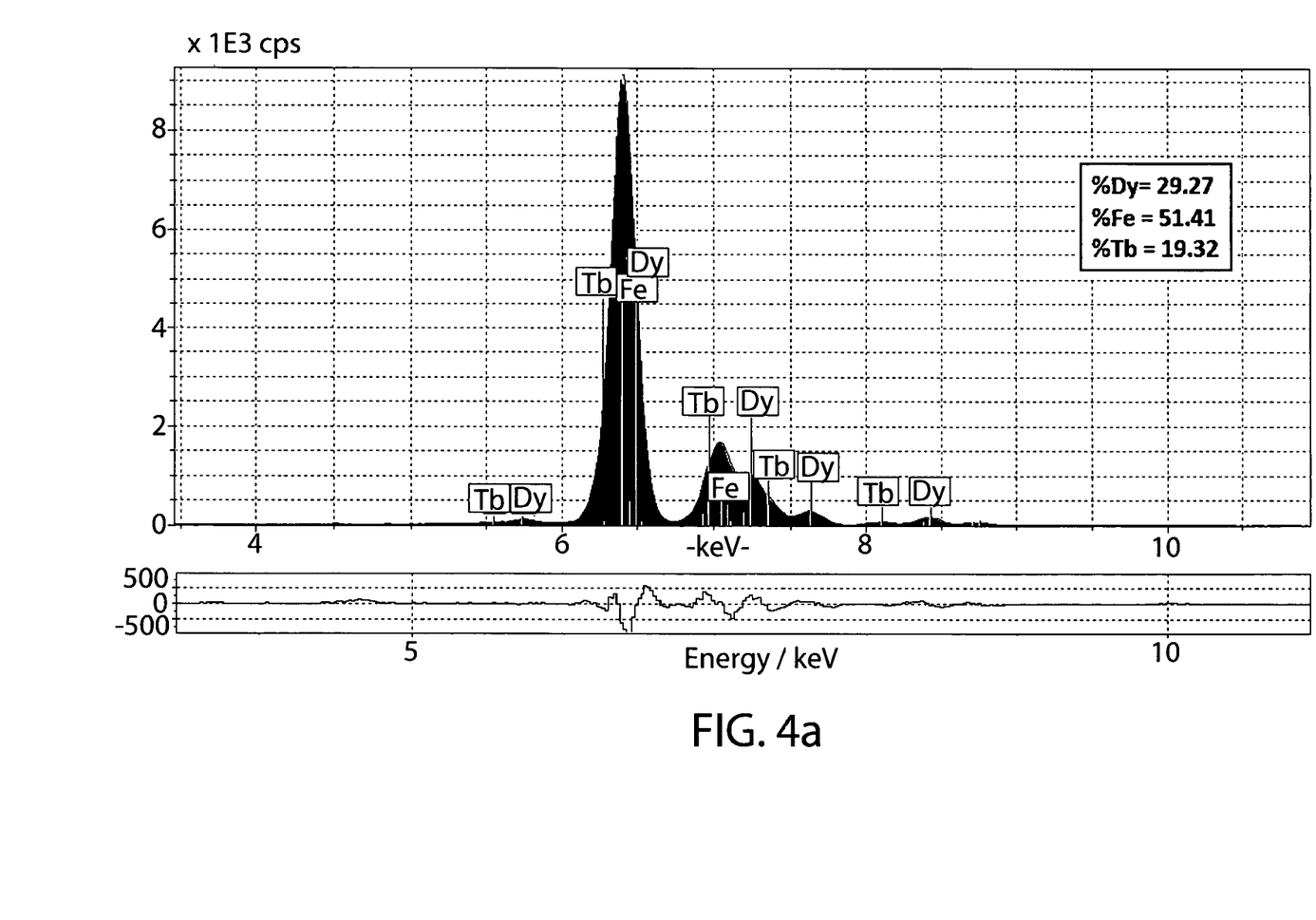
FIG. 4a is the XRF spectra and elemental data for the starting Terfenol-D material and FIG. 4b is the XRF spectrum and elemental data for the final $RE_2O_3$ product resulting from practice of the invention.

The XRF spectra and elemental data showed the composition of the starting Terfenol-D material as: Dy=29.27%, Fe=51.41% and Tb=19.32%.

Figure 4B:
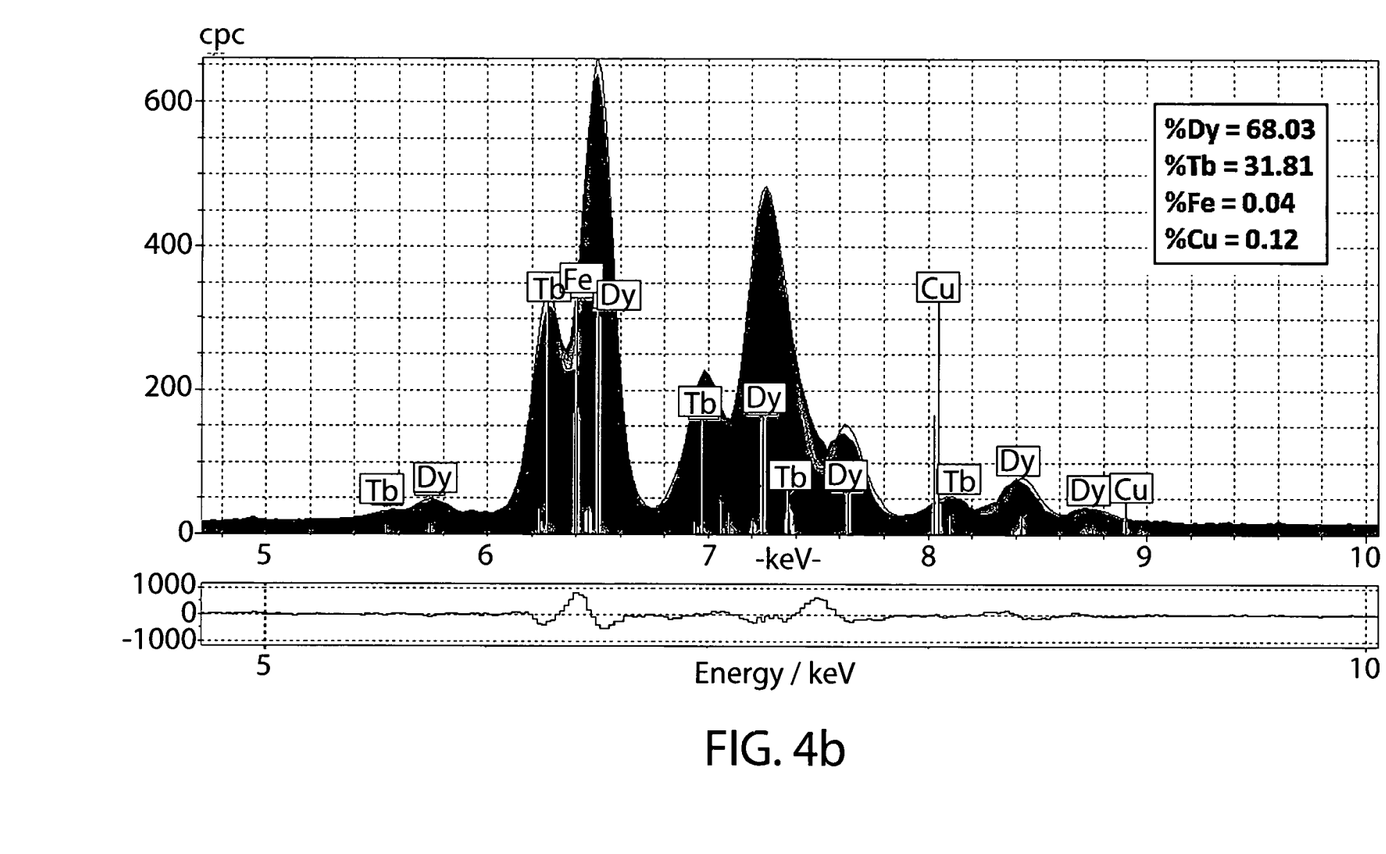

A minimum yield, confirmed by XRF measurements in weight %, of RE-oxides was greater than or equal to 80% of more than 99% purity comprising: Tb=31.81%, Dy=68.03%, Fe=0.04% and Cu=0.12%.

The waste water clean-up was performed with $Ca(OH)_2$ pursuant to reaction Equation (6) above.

The present invention is advantageous in that a short duration chemical dissolution of the materials in a copper (II) aqueous solution followed by the other steps set forth above can achieve >99% purity of the separated rare earth metal oxides, sulfates or phosphates. For RE-Co material such as, but not limited to Sm—Co, high purity cobalt compound is also separated as cobalt-phosphate. The purity level of the recovered materials pursuant to this invention can be further improved if the materials are subjected to additional purification process. The chemical dissolution method pursuant to the invention eliminates the need for acids but, instead, is water-based so as to avoid the use of auxiliary hazardous chemicals or waste generation. The copper content of the aqueous solution is recovered as metallic copper or oxides of copper which has economic values. Practice of this invention is water-based and requires only inexpensive and readily available chemicals to ensure low-OPEX for the process. The process requires no complex technological systems or equipment and can be easily incorporated into existing manufacturing or separation process or be developed as a low-CAPEX new rare earth elements recycling facility.

While the invention has been described in terms of specific embodiments thereof, it is not intended to be limited thereto but rather only to the extent set forth in the following claims.

We claim:

1. A method for use in recycling rare earth metal-containing material wherein the rare earth metal comprises at least one of Sc, Y, La, Ce, Nd, Pr, Sm, Eu, Gd, Tb, Dy, Ho, Er, Tm, Yb, and Lu, comprising contacting the rare earth metal-containing material and an acid-free aqueous solution of a copper (II) salt and dissolving the rare earth metal-containing material in the aqueous copper solution wherein the dissolved rare earth metal can be chemically precipitated as a rare earth metal compound from the acid-free aqueous solution.

2. The method of claim 1 including the additional step of precipitating the rare earth metal as a rare earth metal compound from the acid-free aqueous solution.

3. The method of claim 1 including the further step of calcining the rare earth metal compound to produce a rare earth metal oxide.

4. The method of claim 1 wherein the aqueous solution comprises 0.1 to 75 mole % copper (II) salt and balance water.

5. The method of claim 4 wherein the aqueous solution comprises a copper (II) acetate solution.

6. The method of claim 4 wherein the aqueous solution comprises a copper (II) nitrate solution.

7. The method of claim 4 wherein the aqueous solution comprises a copper (II) chloride solution.

8. The method of claim 4 wherein the aqueous solution comprises a copper (II) sulfate.

9. The method of claim 8 wherein the material comprises Sm—Co magnet material.

10. The method of claim 4 wherein the aqueous solution comprises of at least one of copper (II) acetate, copper (II) nitrate, copper (II) chloride, and copper (II) sulfate and balance water.

11. The method of claim 1 wherein the aqueous solution is maintained at a temperature up to 100° C.

12. The method of claim 1 wherein the material comprises two or more rare earth metals.

13. The method of claim 12 wherein the material includes two or more rare earth metals selected from the group consisting of Sc, Y, La, Ce, Nd, Pr, Sm, Eu, Gd, Tb, Dy, Ho, Er, Tm, Yb, and Lu.

14. The method of claim 13 wherein the material comprises permanent magnet material.

15. The method of claim 12 wherein the material is a magnetostrictive alloy containing terbium, dysprosium, and iron.

16. The method of claim 1 wherein the dissolved rare earth metal ions are chemically precipitated as a rare earth metal oxalate, rare earth metal sulfate or rare earth phosphate.

17. The method of claim 1 including chemically precipitating metallic copper from the aqueous solution.

18. The method of claim 1 including chemically precipitating copper oxides from the aqueous solution.

19. The method of claim 1 wherein the material comprises a magnet of any shape.

20. The method of claim 1 wherein the material comprises magnet scrap.

21. The method of claim 20 wherein the magnet scrap includes shredded hard disk drive material.

22. The method of claim 1 wherein the material comprises at least one of grinding swarf, magnet scrap cuttings, polishing byproducts, magnet powders, and magnets derived from manufacturing processes including magnet manufacturing and additive manufacturing processes.

23. The method of claim 1 wherein the material comprises at least one rare earth metal and iron, both of which are dissolved as ions, and wherein the dissolved rare earth metal ions are separated from dissolved Fe ions in the acid-free aqueous solution by chemical precipitation of a rare earth metal compound.

24. The method of claim 23 wherein the material comprises at least one of Nd and Pr, and iron and boron.

25. The method of claim 1 wherein the material comprises an end-of-life rare earth permanent magnet-containing device.

\* \* \* \* \*